(12) United States Patent
Kern et al.

(10) Patent No.: US 9,529,860 B2
(45) Date of Patent: Dec. 27, 2016

(54) KEYWORD FREQUENCY ANALYSIS SYSTEM

(71) Applicant: Bank of America Corporation, Charlotte, NC (US)

(72) Inventors: Daniel C. Kern, Charlotte, NC (US); Pasha M. Maher, Charlotte, NC (US); Adam Z. Sun, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 109 days.

(21) Appl. No.: 14/557,067

(22) Filed: Dec. 1, 2014

(65) Prior Publication Data

US 2016/0154797 A1    Jun. 2, 2016

(51) Int. Cl.
*G06F 17/30* (2006.01)
*G06F 7/00* (2006.01)

(52) U.S. Cl.
CPC ..... *G06F 17/3053* (2013.01); *G06F 17/30554* (2013.01)

(58) Field of Classification Search
CPC ............... G06F 17/30554; G06F 17/3053
USPC .......................................... 707/730
See application file for complete search history.

(56) References Cited

U.S. PATENT DOCUMENTS

| | | | |
|---|---|---|---|
| 7,836,050 B2 | 11/2010 | Jing et al. | |
| 7,873,567 B2 | 1/2011 | Eder | |
| 8,266,148 B2 | 9/2012 | Guha et al. | |
| 8,498,915 B2 | 7/2013 | Eder | |
| 8,589,399 B1 * | 11/2013 | Lee et al. | 707/737 |
| 8,595,219 B1 | 11/2013 | Thompson | |
| 2005/0120011 A1 * | 6/2005 | Dehlinger et al. | 707/3 |
| 2006/0248096 A1 | 11/2006 | Adam | |
| 2007/0043755 A1 * | 2/2007 | Rolleke | 707/102 |
| 2007/0100875 A1 * | 5/2007 | Chi et al. | 707/102 |
| 2008/0195595 A1 * | 8/2008 | Masuyama et al. | 707/5 |
| 2008/0231644 A1 * | 9/2008 | Lempel et al. | 345/689 |
| 2009/0077073 A1 * | 3/2009 | Masuyama et al. | 707/6 |
| 2009/0157465 A1 * | 6/2009 | Heathfield | 705/8 |
| 2009/0300006 A1 * | 12/2009 | Bose Rantham Prabhakara et al. | 707/5 |
| 2009/0313243 A1 * | 12/2009 | Buitelaar et al. | 707/5 |
| 2010/0169327 A1 * | 7/2010 | Lindsay et al. | 707/750 |

(Continued)

OTHER PUBLICATIONS

Daniel C. Kern et al., "Cross Dataset Keyword Rating System," U.S. Appl. No. 14/459,090, filed with the USPTO Aug. 13, 2014, 39 Pages.

*Primary Examiner* — Kuen Lu
(74) *Attorney, Agent, or Firm* — Michael A. Springs

(57) ABSTRACT

According to embodiments of the present disclosure, a keyword frequency analysis system stores a plurality of sets of records. Each set of records may be associated with a dimension and may comprise a first keyword and a second keyword. The system may also receive the plurality of sets of records, determine a frequency of the first keyword in each set of records and determine a frequency of the second keyword in each set of records. The system may further determine an expected frequency of the first keyword in a first set of records associated with a first dimension, based on the frequency of the first keyword and the frequency of the second keyword. The system also compares the frequency of the first keyword and the expected frequency and, based on the comparison, determines whether the first keyword is either overrepresented or underrepresented in the first set of records.

18 Claims, 5 Drawing Sheets

(56) References Cited

U.S. PATENT DOCUMENTS

| | | |
|---|---|---|
| 2010/0241507 A1* | 9/2010 | Quinn et al. ............... 705/14.42 |
| 2011/0238408 A1* | 9/2011 | Larcheveque et al. ........... 704/9 |
| 2012/0265520 A1* | 10/2012 | Lawley ............................ 704/9 |
| 2013/0185274 A1* | 7/2013 | Zwicky et al. ............... 707/706 |
| 2014/0032567 A1* | 1/2014 | Assadollahi et al. ......... 707/742 |

* cited by examiner

KEYWORD FREQUENCY ANALYSIS SYSTEM

TECHNICAL FIELD

This invention relates generally to dataset analysis, and more specifically to a keyword frequency analysis system.

BACKGROUND

Enterprises and financial institutions create and store a plurality of records in one or more databases containing information regarding risks the enterprise faces, process measurements the enterprise monitors, and losses and issues experienced by the enterprise. Current keyword analysis systems are limited.

SUMMARY OF EXAMPLE EMBODIMENTS

According to embodiments of the present disclosure, a keyword frequency analysis system stores a plurality of sets of records. Each set of records may be associated with a dimension and may comprise a first keyword and a second keyword. The system may also receive the plurality of sets of records, determine a frequency of the first keyword in each set of records and determine a frequency of the second keyword in each set of records. The system may further determine an expected frequency of the first keyword in a first set of records associated with a first dimension, based on the frequency of the first keyword and the frequency of the second keyword. The system also compares the frequency of the first keyword and the expected frequency and, based on the comparison, determines whether the first keyword is either overrepresented or underrepresented in the first set of records. The system translates the comparison, the frequency of the first keyword, the frequency of the second keyword, and the expected frequency into a keyword report and communicates the keyword report for display.

Certain embodiments of the present disclosure may provide one or more technical advantages. In certain embodiments, a keyword frequency analysis system generates reports or other information for display regarding the overrepresentation or underrepresentation of one or more keywords. This allows an administrator to readily identify the keywords that are overrepresented or underrepresented in certain sets of records, which indicates a potential issue, such as a future operational loss, for the enterprise. This system conserves computational resources when comparing the actual and expected frequencies of the keywords and allows an administrator to more readily and accurately identify the most significant risk to the enterprise.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Figure 1:
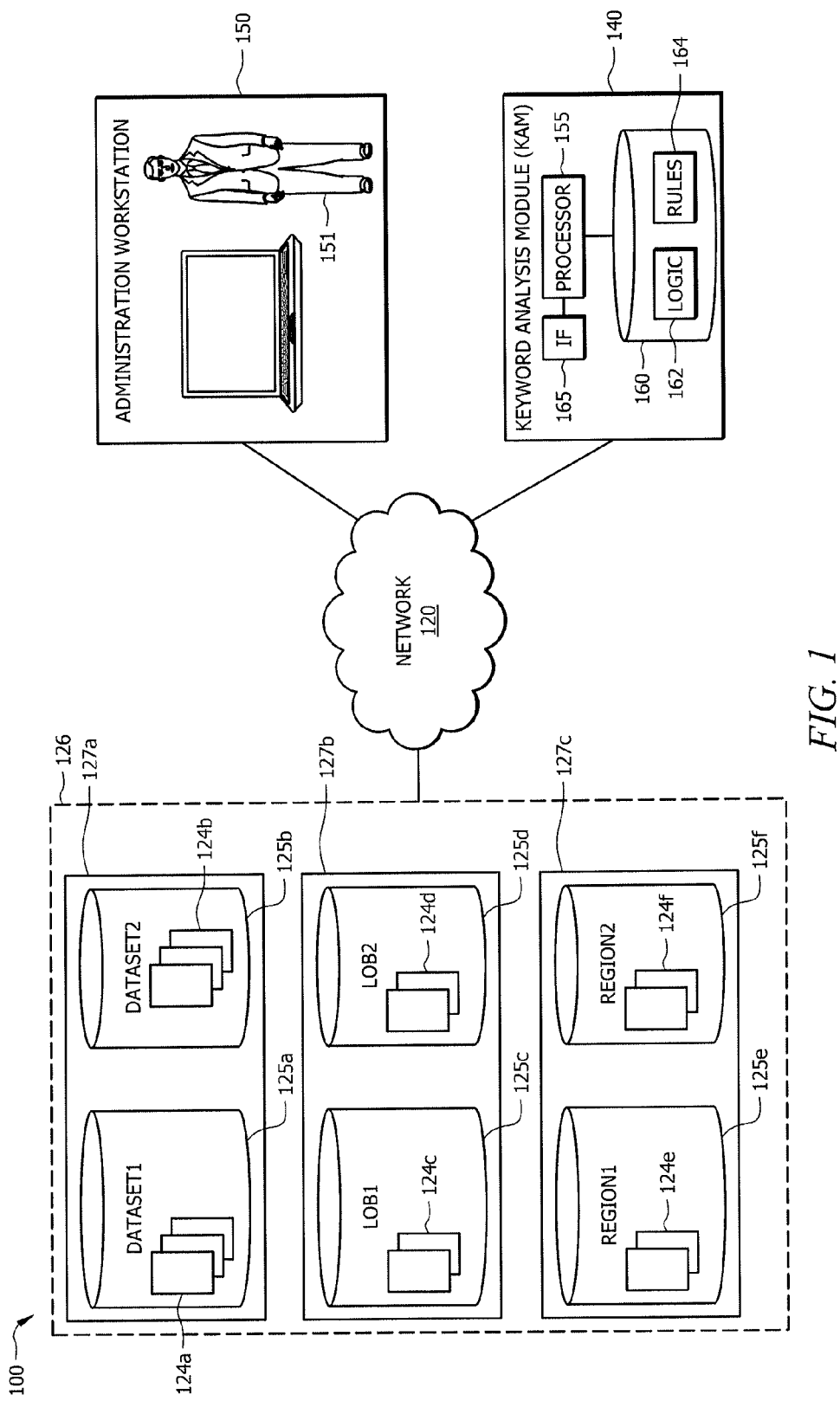
FIG. 1 illustrates an example system 100 that facilitates keyword analysis.

Glossary:

Enterprise represents an individual, business, company, or other organization. An example of an enterprise may include a Financial Institution.

Financial Institution represents an individual, business, company, or organization that engages in financial activities and/or provides financial products and/or services, which may include, but are not limited to, banking and investment activities, such as maintaining accounts (e.g., transaction accounts, savings accounts, credit accounts, investment accounts, insurance accounts, portfolios, etc.), receiving deposits, crediting accounts, debiting accounts, extending credit to account holders, purchasing securities, providing insurance, and/or supervising a customer's portfolio.

Graphical User Interface (GUI) represents any suitable component that displays information to a user. A GUI is generally operable to tailor and filter data entered by and presented to the user. The GUI may provide the user with an efficient and user-friendly presentation of information using a plurality of displays having interactive fields, pull-down lists, and buttons operated by the user. The GUI may include multiple levels of abstraction including groupings and boundaries. It should be understood that the term GUI may be used in the singular or in the plural to describe one or more GUIs in each of the displays of a particular GUI.

Interface represents any suitable device operable to receive information from the network, transmit information through the network, perform processing of information, communicate with other devices, or any combination of the preceding. The network interface represents any port or connection, real or virtual, including any suitable hardware and/or software, including protocol conversion and data processing capabilities, to communicate through a Local Area Network, Wide Area Network, or other communication system that allows the components within the system to exchange information.

Keyword represents a word included in a record that indicates an idea important to the enterprise. A keyword may be a word that the system has the ability to identify or locate. Keywords may be created by an administrator of the system, an employee of the enterprise, or any other entity operable to create a record.

Logic represents rules, algorithms, code, tables, and/or other suitable instructions embodied in a computer-readable storage medium for performing the described functions and operations of a component.

Memory represents a component of a module operable to store data and information for use in analyzing one or more keywords. The memory may store, either permanently or temporarily, data, operational software, or other information for the processor. The memory may include any one or a combination of volatile or non-volatile local or remote devices suitable for storing information. For example, the memory may include random access memory (RAM), read only memory (ROM), magnetic storage devices, optical storage devices, or any other suitable information storage device or a combination of these devices.

Network represents any suitable network operable to facilitate communication between the components of the system. The network may comprise a single network or multiple networks and may include any interconnecting system capable of transmitting audio, video, signals, data, messages, or any combination of the preceding. The network may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. The network may additionally include any combination of gateways, routers, hubs, switches, access points, base stations, wireless telephone systems and any other hardware, software or a combination thereof.

Processor represents any hardware and/or software that operates to control and process information. A processor may be a programmable logic device, a microcontroller, a microprocessor, any suitable processing device, or any suitable combination of the preceding.

Record represents any document containing information. A record may be created by an administrator of a system, an employee of an enterprise, or by a component of the system itself. The record may include information about the enterprise including, for example, problems or issues the enterprise encounters, and information about the problem or issue, such as what occurred, how it was resolved, and any loss suffered by the enterprise.

Embodiments of the present invention and its advantages are best understood by referring to FIGS. 1-4, like numerals being used for like and corresponding parts of the various drawings.

Banks, business enterprises, and other financial institutions that conduct transactions with customers may gather and analyze data regarding various risks to the enterprise, including operational risk. The teachings of this disclosure recognize that it would be desirable to have a system that can analyze the frequency of certain keywords across different dimensions and sets of records, creating a system to determine when a keyword appears more or less frequently than expected, which may indicate issues.

FIG. 1 illustrates an example system 100 that facilitates keyword analysis. System 100 may include administrator workstation 150, administrator 151, system of record 126, one or more record dimensions 127, one or more sets of records, records 124, network 120, and Keyword Analysis Module (KAM) 140. Administrator workstation 150, one or more systems of records 126, and KAM 140 may be communicatively coupled by network 120.

In general, KAM 140 may receive a plurality of sets of records, determine a frequency of a first keyword in each set of records, and determine a frequency of the other keywords in each set of records. KAM 140 may further determine an expected frequency of the first keyword in a first set of records associated with a first dimension based on the frequency of the first keyword and the frequencies of the other keywords. KAM 140 also compares the frequency of the first keyword and its expected frequency and, based on the comparison, determines whether the first keyword is either overrepresented or underrepresented in the first set of records.

Administrator workstation 150 may refer to any device that facilitates administrator 151 performing a function in system 100. In some embodiments, administrator workstation 150 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 100. Administrator workstation 150 may also comprise any suitable user interface such as a display, microphone, keyboard, or any other appropriate terminal equipment usable by administrator 151, such as a graphical user interface (GUI). It will be understood that system 100 may comprise any number and combination of administrator workstations 150. Administrator 151 utilizes administrator workstation 150 to interact with KAM 140 to receive information, reports, and visualizations communicated from KAM 140 for display, as described below.

Network 120 may refer to any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof, operable to facilitate communication between the components. Network 120 may additionally include any combination of gateways, routers, hubs, switches, access points, base stations, wireless telephone systems and any other hardware, software or a combination thereof.

System of record 126 may comprise one or more record dimensions 127, sets of records 125, and records 124. In some embodiments, records 124 contain information relating to items from a particular set of records 125. For example, records 124 may be a record created by administrator 151 after the enterprise encounters any problems, such as a loss of money, a malfunction in a system, or a fraud occurring. Continuing the example, administrator 151 may create record 124 to save information related to the item, such as what the problem was, what occurred, how it was resolved, and the loss suffered by the enterprise.

A plurality of records 124 may be included in one or more sets of records 125. Set of records 125 may be a group of records 124 pertaining to the same field or branch of the enterprise. For example, sets of records 125a or 125b may correspond to two different types of datasets, which may include operational loss data, metrics, issues (e.g., website functionality down, internal server down), risks, and external loss data. As another example, sets of records 125c and 125d may correspond to two different lines of business, which may include compliance, consumer banking, corporate audit, corporate security, commercial banking, corporate banking, markets, human resources, marketing, technology, investment management, mortgage, or legal. As yet another example, sets of records 125e and 125f may correspond to two different regions of the word, which may include Latin America; Asia Pacific; Europe, Middle East, and Africa; and North America.

Each record dimension 127 may comprise one or more sets of records 125. Record dimension 127 may be a group of sets of records 125 pertaining to the same category. For example, record dimension 127a may include each set of records 125 categorized by dataset. As another example, record dimension 127b may include each set of records 125 categorized by line of business. As yet another example, record dimension 127c may include each set of records 125 categorized by a certain region of the world. Record 124 may appear in multiple record dimensions 127 and multiple sets of records 125 depending on the applicability. For example, if record 124 involves operation loss data (dataset) in consumer banking (line of business) in Latin America (region), then record 124 may appear in set of record 125*a*, 125*c*, and 125*e*. System 100 may include any number of systems of record 126, record dimensions 127, sets of records 125, and records 124. In certain embodiments, KAM 140 accesses records 124 to determine a frequency of a first keyword in each set of records 125.

KAM 140 may refer to any suitable combination of hardware and/or software implemented in one or more modules to process data and provide the described functions and operations. In some embodiments, the functions and operations described herein may be performed by a pool of KAMs 140. In some embodiments, KAM 140 may include, for example, a mainframe, server, host computer, workstation, web server, file server, a personal computer such as a laptop, or any other suitable device operable to process data. In some embodiments, KAM 140 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

In general, KAM 140 accesses records 124 comprising a keyword, determines an expected frequency of a keyword, and determines whether the keyword is either overrepresented or underrepresented in its set of records 125 or dimension 127. In some embodiments, KAM 140 may include processor 155, memory 160, and interface 165.

Memory 160 may refer to any suitable device capable of storing and facilitating retrieval of data and/or instructions. Examples of memory 160 include computer memory (for example, RAM or ROM), mass storage media (for example, a hard disk), removable storage media (for example, a CD or a DVD), database and/or network storage (for example, a server), and/or or any other volatile or non-volatile, non-transitory computer-readable memory devices that store one or more files, lists, tables, or other arrangements of information. Although FIG. 1 illustrates memory 160 as internal to KAM 140, it should be understood that memory 160 may be internal or external to KAM 140, depending on particular implementations. Also, memory 160 may be separate from or integral to other memory devices to achieve any suitable arrangement of memory devices for use in system 100.

Memory 160 is generally operable to store logic 162 and rules 164. Logic 162 generally refers to algorithms, code, tables, and/or other suitable instructions for performing the described functions and operations. Rules 164 generally refer to policies or directions for determining a frequency of keywords, determining an expected frequency for keywords, and determining whether keywords are overrepresented or underrepresented. Rules 164 may be predetermined or predefined, but may also be updated or amended based on the needs of enterprise 110.

Memory 160 communicatively couples to processor 155. Processor 155 is generally operable to execute logic 162 stored in memory 160 to determine an expected frequency for keywords and determine whether keywords are overrepresented or underrepresented, according to the disclosure. Processor 155 may comprise any suitable combination of hardware and software implemented in one or more modules to execute instructions and manipulate data to perform the described functions for KAM 140. In some embodiments, processor 155 may include, for example, one or more computers, one or more central processing units (CPUs), one or more microprocessors, one or more applications, and/or other logic.

In some embodiments, communication interface 165 (I/F) is communicatively coupled to processor 155 and may refer to any suitable device operable to receive input for KAM 140, send output from KAM 140, perform suitable processing of the input or output or both, communicate to other devices, or any combination of the preceding. Communication interface 165 may include appropriate hardware (e.g., modem, network interface card, etc.) and software, including protocol conversion and data processing capabilities, to communicate through network 120 or other communication system that allows KAM 140 to communicate to other devices. Communication interface 165 may include any suitable software operable to access data from various devices such as system of records 126, record dimensions 127, sets of records 125, records 124, and administrator workstation 150. Communication interface 165 may also include any suitable software operable to transmit data to various devices such as administrator workstation 150. Communication interface 165 may include one or more ports, conversion software, or both. In general, communication interface 165 may access one or more records 124 comprising the keyword, and communicate information to administrator workstation 150 for display to administrator 151.

In operation, logic 162 and rules 164, upon execution by processor 155, facilitate determining an expected frequency for keywords and determining whether keywords are overrepresented or underrepresented. Logic 162 and rules 164 also facilitate determining the frequency of a keyword in each set of records 125.

In some embodiments, KAM 140 may receive a request to determine whether a keyword is overrepresented or underrepresented in a particular record dimension 127 and/or set of records 125. KAM 140 may receive the request at interface 165 from administrator workstation 150 via network 120. In some embodiments, the request may include one or more keywords. For example, administrator 151 may request KAM 140 to determine whether the keyword "global" is overrepresented or underrepresented in the region of Latin America. The request may also include a request for a specific type of feedback, such as generating a tree map (see FIG. 4 below), generating a word cloud, or information for display related to the correlation of the frequency of two keywords over a period of time (see FIG. 2 below). The request may be for one or more types of feedback, visual information, or report.

In some embodiments, KAM 140 may access record 124 comprising the keyword. KAM 140 may access one or more records 124 comprising the keyword. For example, KAM 140 may access each record 124 that comprises the keyword at least once, access each record 124 that comprises the keyword above a threshold number of times (e.g., 10), or may access the one hundred records 124 that comprise the most instances of the keyword.

In some embodiments, KAM 140 determines a frequency of one or more keywords in each set of records 125. KAM 140 may determine the frequency of a first keyword, a second keyword, and any number of additional keywords in each set of records 125. In some embodiments, KAM 140 may determine the number of records 124 in which the keyword appears (e.g., even if it appears just one time in the whole record 124). For example, KAM 140 may determine that the keyword "terrible" occurs in 10,000 out of 100,000 records 124. In some embodiments, KAM 140 may determine the frequency in the plurality of records 124 depending on each time it appears, even if multiple times within one record. For example, if the keyword "terrible" occurs five times in record 124a, two times in 124b, and three times in 124e, then KAM 140 may determine the frequency of the keyword "terrible" is ten. KAM 140 may also determine the frequency of the keyword terrible is only three because it appears in three separate records: 124a, 124b, and 124e.

In some embodiments, KAM 140 determines an expected frequency of the first keyword by determining an expected proportion between the total first keyword frequency and the total dimension keyword frequency. Table 1 and Table 2 below show an example of determining an expected frequency. Table 1 shows observed frequencies for four keywords across different sets of records 125 (e.g., Latin America, Asia Pacific, and Europe, Middle East, Africa) within a record dimension 127 (e.g., regions). Table 2 shows the determined expected frequencies for each keyword in each region that was used in Table 1. In determining the expected proportion, KAM 140 may determine a total first keyword frequency by summing the frequency of the first keyword in each set of records 125 within record dimension 127. Using the tables below as an example, KAM 140 may determine the total first keyword frequency for "global" is 60, which KAM 140 determined by adding the frequencies of "global" in each set of records 125 (LATAM 10, APAC 40, and EMEA 10). KAM may repeat this for each keyword, creating a total keyword frequency for each keyword that it analyzes.

In certain embodiments, KAM 140 may also determine the keyword frequency of a first set of records 125 by summing the frequency of all keywords in a specific set of records 125. Using the Table 1 below as an example, KAM 140 may sum the frequencies of all four keywords in the Latin American region (10 for global, 20 for fraud, 10 for audit, and 10 for legal) to determine that the frequencies of the keywords in set of records 125 associated with Latin America is 50. KAM 140 may repeat this process for each set of records 125 within record dimension 127 (e.g., APAC and EMEA). In certain embodiments, KAM 140 may also determine a total dimension keyword frequency, which represents the number of instances of all the keywords in any sets of records 125 within the specific dimension. For example, KAM 140 may sum all the frequencies of each keyword in sets of records 125 (e.g., LATAM 50, APAC, 70, EMEA 80) or may sum all the total keyword frequencies for each keyword (global 60, fraud 40, audit 80, legal 20) to determine that the total dimension keyword frequency is 200.

TABLE 1

Observed Frequencies Across Regions

|  | LATAM | APAC | EMEA | Total |
|---|---|---|---|---|
| "global" | 10 | 40 | 10 | 60 |
| "fraud" | 20 | 10 | 10 | 40 |
| "audit" | 10 | 20 | 50 | 80 |
| "legal" | 10 | 0 | 10 | 20 |
| Total | 50 | 70 | 80 | 200 |

TABLE 2

Expected Frequencies Across Regions

|  | LATAM | APAC | EMEA | Total |
|---|---|---|---|---|
| "global" | 15 | 21 | 24 | 60 |
| "fraud" | 10 | 14 | 16 | 40 |
| "audit" | 20 | 28 | 32 | 80 |
| "legal" | 5 | 7 | 8 | 20 |
| Total | 50 | 70 | 80 | 200 |

In this example, KAM 140 may use the observed frequencies to calculate the expected frequencies, with the assumption that each should have similar proportions to each other. KAM 140 may use the total first keyword frequency and the total dimension keyword frequency to determine an expected frequency of a keyword in a particular set of records 125. Table 2 replicates the totals from Table 1 and KAM 140 may use those to determine the expected frequencies for each keyword. For example, KAM 140 may determine the expected frequency of "global" in set of records 125 associated with Latin America may be the total first keyword frequency across all regions (60) times the frequency of all the keywords within the Latin American region (50) divided by the total dimension keyword frequency (200), to determine the expected frequency of "global" should be 15. The other expected frequencies for each keyword within each region may be calculated by KAM 140 in a similar fashion. This is an example of how KAM 140 may determine the expected frequency of one or more keywords.

In some embodiments, KAM 140 determines the expected frequency for a future time period based on past observed data. In some embodiments, KAM 140 determines the expected frequency of the first keyword by determining the frequency of the first keyword in each set of records 125 for a plurality of past time periods and calculating an average of the frequency of the first keyword for the plurality of past time periods. KAM 140 may calculate a running average using only data from the most recent time periods or may use data from all past time periods to create an average. For example, KAM 140 may use the monthly average frequency of the keyword "global" in set of records 125c associated with the mortgage line of business from only the most recent past six months. In some embodiments, KAM 140 may use these averages to determine the expected frequency. In certain embodiments, KAM 140 may use these averages or may use the raw frequency data to determine an expected frequency and also to determine point-wise confidence intervals corresponding to expected frequency. For example, KAM 140 may determine the expected frequency for "fraud" in the North American region is 29 and also determine a 95% confidence interval for this expected frequency. In certain embodiments, KAM 140 may determine a confidence band rather than a specific number for an expected frequency. For example, the expected frequency may be a range of numbers, such as between 25 and 35, rather than a single data point.

In some embodiments, KAM compares the frequency of the first keyword and the expected frequency of the first keyword. Based on this comparison, KAM 140, in some embodiments, may determine whether the first keyword selected is overrepresented or underrepresented in the first set of records 124. KAM 140 may do a direct comparison to determine overrepresentation or underrepresentation. For example, if "audit" within set of records 125d has an actual frequency of 25 for a particular month and an expected frequency of 50, KAM 140 may determine the keyword "audit" is underrepresented in set of records 125*d* for that month. In some embodiments, KAM 140 may rely on a variety of statistical tools to determine whether the difference between the actual frequency and the expected frequency are statistically significant. For example, KAM 140 may perform Chi-Squared or Cochrane-Mantel-Haenszel (CMH) tests, which would indicate whether at least one of the values in a group is different by a statistically significant amount. KAM 140 could then more closely compare the actual frequency against the expected frequency for each keyword to determine which keyword in which set of records 125 is over or underrepresented. In some embodiments, administrator 151 could review data to determine which keyword may be overrepresented or underrepresented.

Figure 4:
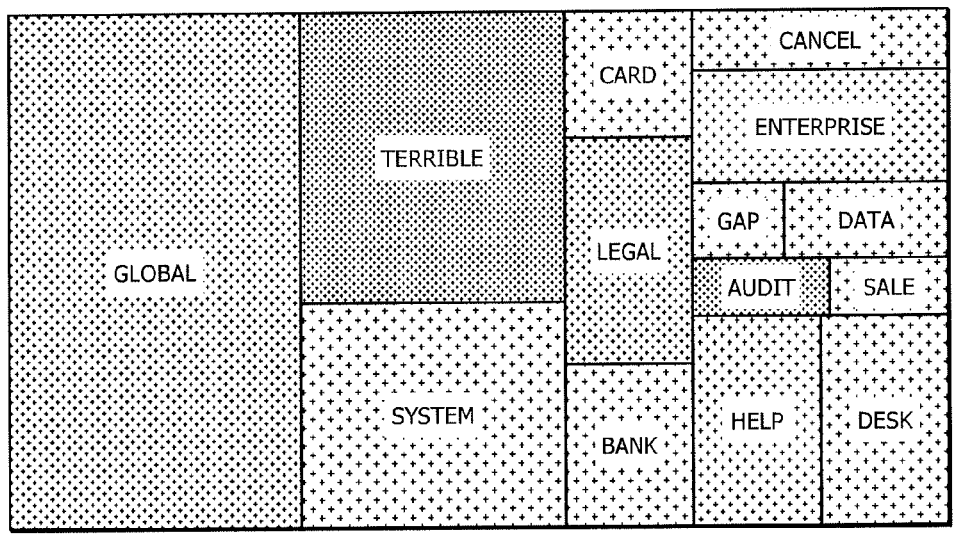
FIG. 4 illustrates an example tree map showing the frequency and degree of overrepresentation or underrepresentation of a plurality of keywords.

In some embodiments, KAM 140 may translate the comparison, the frequency of the first keyword, the frequency of other keywords, and all their respective expected frequencies into a keyword report. In some embodiments, KAM 140 may communicate the keyword report for display. KAM 140 may communicate this information for display from interface 165 via network 120 to administrator workstation 150. The keyword report may take any form suitable to inform administrator 151 of any part of the keyword analysis performed by KAM. For example, keyword report may be an email alerting administrator 151 that one or more keywords are underrepresented or overrepresented for the most recent time period (e.g., last week, last month, last six months). As another example, keyword report may include visualizations such as a word cloud as described below, a tree map (e.g., as shown in FIG. 4), or a correlation regression chart (e.g., as shown in FIG. 2).

A component of system 100 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to the systems described herein without departing from the scope of the invention. For example, system 100 may include any number of administrators 151, administrator workstations 150, networks 120, KAMs 140, systems of record 126, dimensions 127, sets of records 125, and records 124. Moreover, the operations may be performed by more, fewer, or other components. For example, particular functions such as determining the frequency of a first keyword, may be performed by a separate component and KAM 140 may receive the information regarding the keyword frequency. Additionally, the operations may be performed using any suitable logic comprising software, hardware, and/or other logic. As used in this document, "each" refers to each member of a set or each member of a subset of a set.

Figure 2:
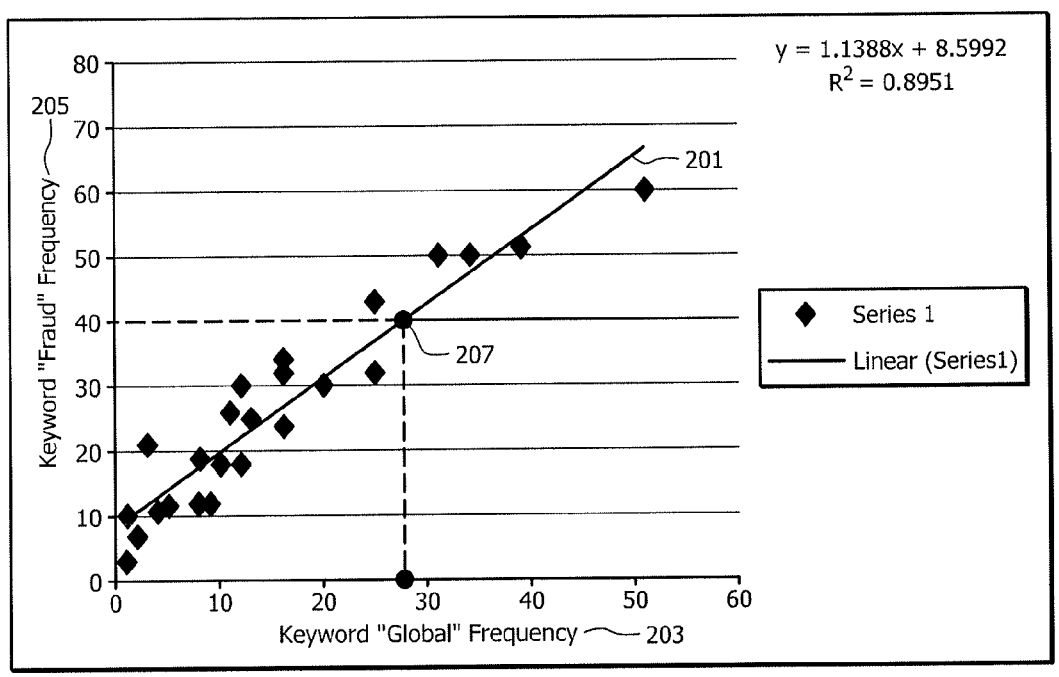
FIG. 2 illustrates an example graph showing the correlation between two keywords.

FIG. 2 illustrates an example graph showing the correlation between two keywords. FIG. 2 may be generated by determining the frequency of a first keyword and a second keyword for a first time period and determining a correlation between the two frequencies. KAM 140 may determine the frequency of a first keyword and a second keyword in set of records 125 for a plurality of time periods. For example, KAM 140 may determine the frequency of "global" and "fraud" in the operational loss dataset 125*a* each month for the past twenty-four months. Continuing the example, KAM 140 may plot each data point to create a scatter plot, each data point representing the frequency of "global" (along the X axis 203) and the frequency of "fraud" (along the Y axis 205) for that particular month. KAM 140, in some embodiments, may determine a correlation between the two frequencies. For example, KAM 140 may determine an equation of line to correlate the frequency of "global" with the frequency of "fraud" and may also determine an R squared regression to determine how accurate the line is. If the R squared value indicates a strong correlation (e.g., a value close to one), KAM 140, in some embodiments, may use this line as a tool to determine expected frequencies of each keyword. For example, as shown in FIG. 2, the R squared value is 0.8951, which is relatively close to one, thus illustrating a strong correlation between "global" and "fraud."

In some embodiments, KAM 140 may utilize this line equation to determine an expected frequency of one of the keywords in the graph. For example, if an observed frequency for "fraud" during a future month is 40 instances, KAM may use the line equation to determine the expected frequency of "global" would be about 27.5. In some embodiments, KAM 140 may utilize this line and line equation to determine whether one of the keywords is overrepresented or underrepresented. For example, if the plotted frequency of "global" and "fraud" for a future month is not near the line, or even a certain threshold away from the line, it may indicate that one or both of the frequencies are overrepresented or underrepresented.

Modifications, additions, or omissions may be made to the correlation and regression chart described herein without departing from the scope of the invention. For example, system 100 may create any number of graphs or visuals associated with a plurality of keywords. As another example, FIG. 2 may include information regarding the frequency of a plurality of keywords, rather than just two keywords as illustrated.

Figure 3A:
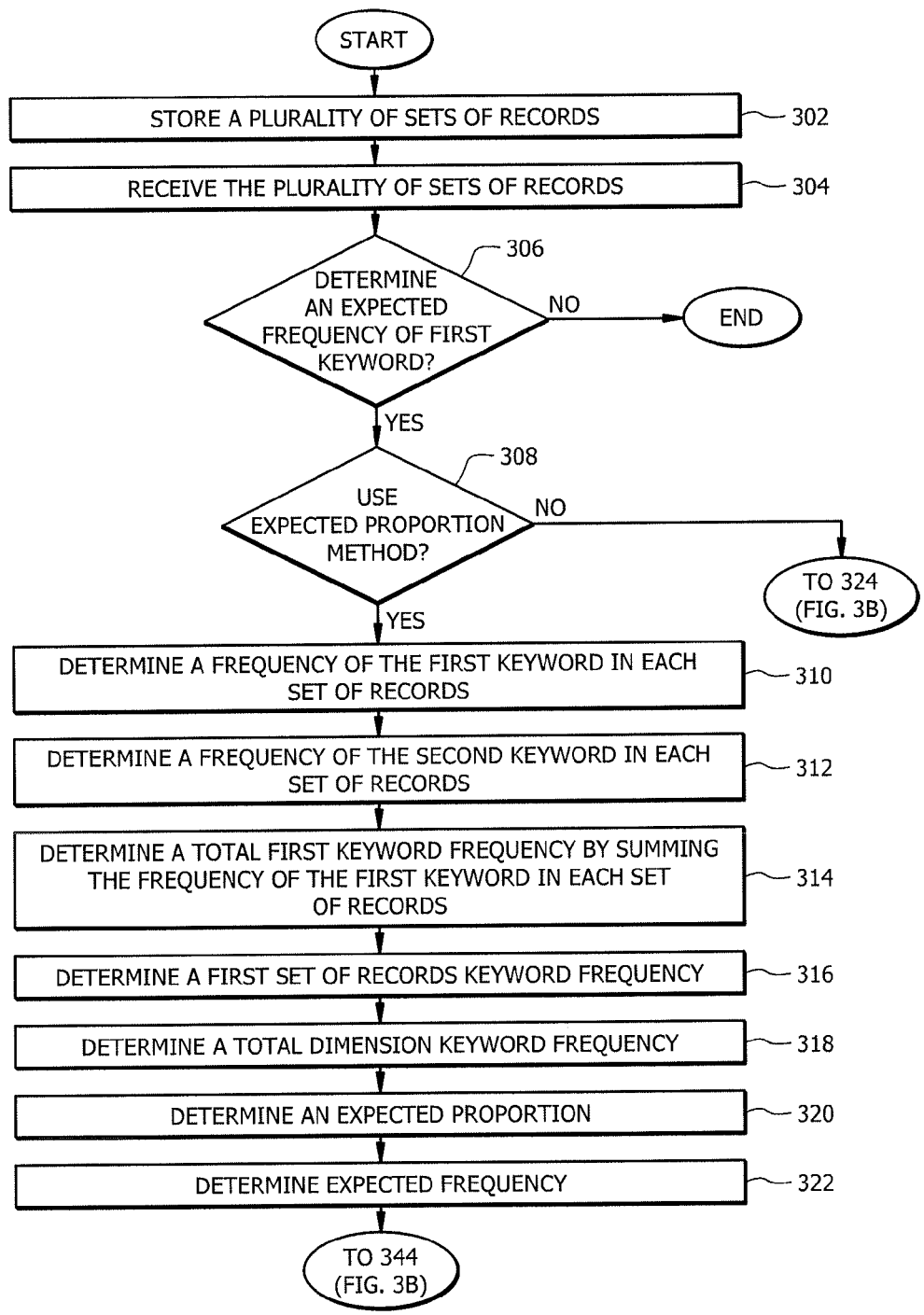
FIGS. 3A-C illustrate an example flowchart for facilitating keyword analysis.
Figure 3B:
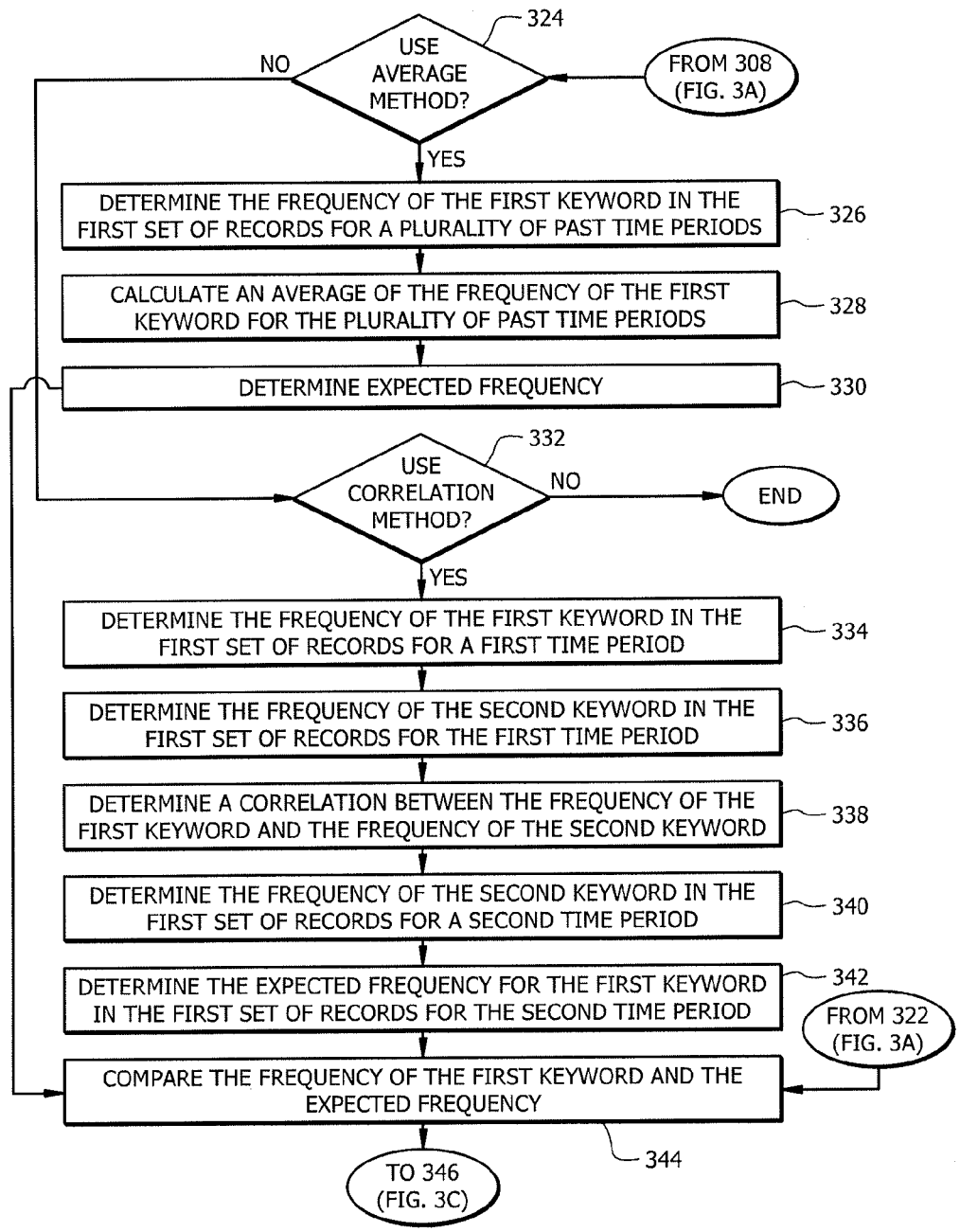
Figure 3C:
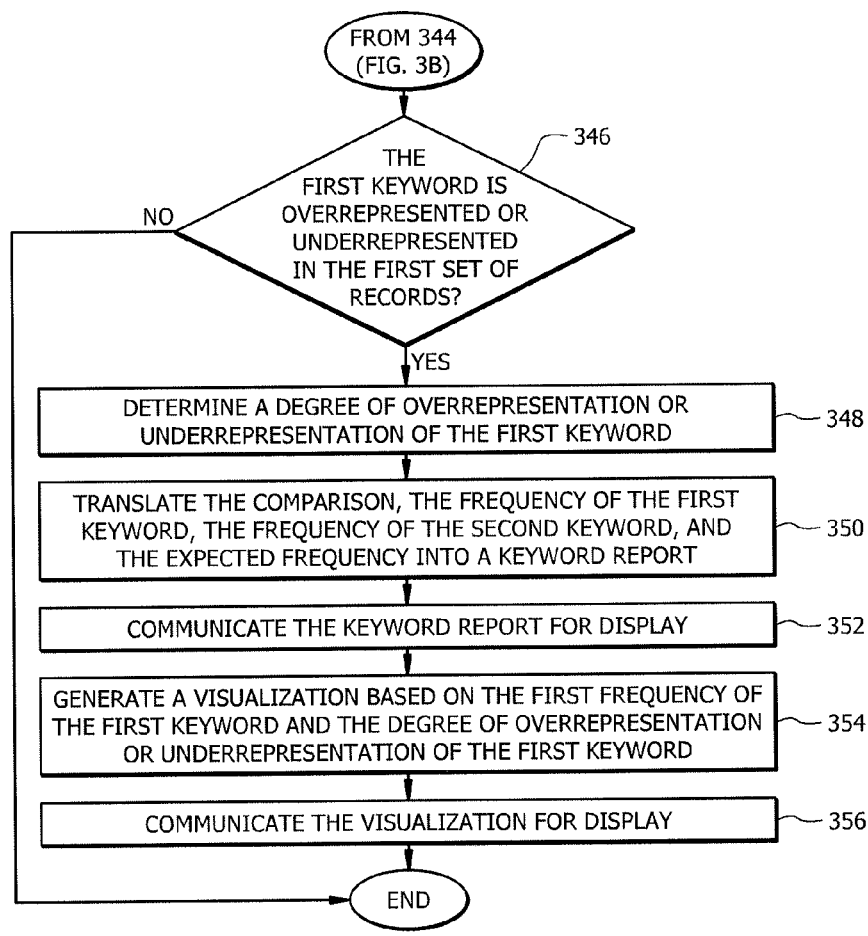

FIGS. 3A-C illustrate an example flowchart for facilitating keyword analysis. At step 302, in some embodiments, a plurality of sets of records 125 are stored. Each set of records 125 is associated with a record dimension 127 and comprises a first keyword and a second keyword (but may extend to more keywords as well). KAM 140 may store the plurality of sets of records 125 in memory 160 or they may be stored in system of record 126. At step 304, in some embodiments, KAM 140 may receive the plurality of sets of records 125. KAM 140 may receive the plurality of sets of records 125 at interface 165 from system of record 126 via network 120.

At step 306, in some embodiments, KAM 140 determines whether to determine an expected frequency of a first keyword. KAM 140 may perform this function in response to receiving a request from administrator 151. For example, administrator may want to know whether a particular keyword, for example, "global" is overrepresented or underrepresented in a particular set of records 125. Continuing the example, in response to receiving the request, KAM 140 would determine an expected frequency of "global." KAM 140, in some embodiments, may determine an expected frequency of a keyword on a regular basis. For example, KAM 140 may consistently monitor whether keywords are overrepresented or underrepresented and perform the analysis on each keyword during a regular time interval (e.g., weekly, monthly), and thus would determine the expected frequency on a regularly time internal as well. If KAM 140 decides not to determine an expected frequency of a first keyword at step 306, then the method ends. If KAM 140 decides to determine an expected frequency of a first keyword at step 306, the method continues to step 308.

At step 308, KAM 140 determines whether to use the expected proportion method in order to determine the expected frequency of the first keyword. KAM 140 may receive the preferred method in a request from administrator 151. KAM 140 may also analyze the information it has available to determine whether to use the expected proportion method. For example, the expected proportion method requires information on the frequency of at least two keywords in at least two set of records 125. If KAM 140 determines it does not have the necessary information, it may determine not to use the expected proportion method. If KAM 140 determines not to use the expected proportion method at step 308, the method continues to step 324. If KAM 140 determines to use the expected proportion method at step 308, the method continues to step 310.

At step 310, in some embodiments KAM 140 determines a frequency of the first keyword in each set of records 125. KAM 140 may determine the frequency of the first keyword in a particular record dimension 127. For example, KAM 140 may determine the number of records 124 that the keyword "global" appears in dimension 127a, which comprises various datasets of the enterprise (e.g., operational loss data, metrics, issues, risks, and external loss data). KAM 140 may determine the frequency of the keyword "global" in set of records 125a, set of records 125b, and any other set of records 125 within record dimension 127a comprising various datasets. At step 312, in some embodiments, KAM 140 determines the frequency of a second keyword in each set of records 125. KAM 140 may determine the frequency in the same record dimension 127 in the same way it determines the frequency of the first keyword in step 310. For example, KAM 140 may determine the frequency of the second keyword, "fraud," in the same sets of records 125 used to determine the frequency in step 310. Continuing the example, KAM 140 may determine the frequency of the word "fraud" in sets of records 125a, 125b, and any sets of records comprising various datasets. In determining the frequency, KAM 140 may analyze one or more records 124 within each set of records 125. KAM 140 may count the number of records 124a that each keyword appears in at least once. For example, KAM 140 may determine that "global" appears in set of records 125a 20 times and in set of records 125b 30 times, and also determine that "fraud" appears in set of records 125a 3 times and set of records 125b 8 times. In some embodiments, KAM 140 may determine the frequency of any number of keywords in each set of records 125. For example, KAM 140 may determine the frequency of five keywords, "audit," "fraud," "global," "business," and "legal" in each set of records 125.

At step 314, in some embodiments, KAM 140 determines a total first keyword frequency by summing the frequency of the first keyword in each set of records 125. For example, KAM 140 may determine that the first keyword "global" appears in in set of records 125a 20 times and in set of records 125b 30 times, which makes the total first keyword frequency 50. KAM 140 may limit the total first keyword frequency to a particular record dimension 127a. For example KAM 140 may only sum the frequency of the first keyword in sets of records 125 within dimension 127a.

In some embodiments, at step 316, KAM 140 determines a first set of records keyword frequency by summing the frequency of the first keyword in the first set of records associated with the first dimension and the frequency of the second keyword in the first set of records associated with the first dimension. For example, KAM 140 may determine that "fraud" appears in 125a 16 times and 125b 29 times, which makes the set of records keyword frequency for set of records 125a 36 (global 20, fraud 16) and the set of records keyword frequency for set of records 125b 59 (global 30, fraud 29).

At step 318, in some embodiments, KAM 140 determines a total dimension keyword frequency. KAM 140 may sum all of the various set of records keyword frequencies or all of the various total keyword frequencies to determine the total dimension keyword frequency. Continuing the example from above, KAM 140 may determine that the total dimension keyword frequency is 95 (e.g., 36+59 or 50+45).

At step 320, in some embodiments, KAM 140 determines an expected proportion based on the total first keyword frequency and the total dimension keyword frequency. For example, KAM 140 may use the total first keyword frequency of 50, the first set of records frequency 36, and the total dimension frequency 95 to determine an expected proportion of (50*36/95). This expected proportion allows KAM 140 to determine an expected frequency of the first keyword in the first set of records associated with the first dimension in step 322. Once KAM 140 determines the expected frequency at step 322, the method continues to step 344, as described below.

If, at step 308, KAM 140 determines to not use the expected proportion method to determine the expected frequency, the method continues to step 324. At step 324, KAM 140 determines whether to use the average method to determine the expected frequency of the first keyword. KAM 140 may receive the preferred method in a request from administrator 151. KAM 140 may also analyze the information it has available to determine whether to use the expected proportion method. For example, the average method requires information on the frequency of the keyword for at least a certain period of time (e.g., last 12 months) in at least one set of records 125. If KAM 140 determines it does not have the necessary information, it may determine not to use the average method. If KAM 140 determines not to use the average method at step 324, the method continues to step 332. If KAM 140 determines to use the average method at step 324, the method continues to step 326.

At step 326, in some embodiments, KAM 140 determines the frequency of the first keyword in each set of records for a plurality of past time periods. KAM 140 may limit the determination of the frequency to a specific record dimension 127 (e.g., across datasets, across lines of business). For example, KAM 140 may determine the frequency of the first keyword "global" in set of records 125c corresponding to a first line of business such as consumer banking, and set of records 125d which corresponds to a second line of business, such as mortgages. KAM 140 may determine the frequency for a plurality of past time periods (e.g., the past 6 weeks, the past 12 months, the past 31 days). KAM 140 may store this information about the frequency of the first keyword and the plurality of past time periods in memory 160. At step 328, in some embodiments, KAM 140 calculates an average of the frequency of the first keyword for the plurality of past time periods. KAM 140 may limit the average to the most recent set of past time. For example, KAM 140 may use the determined frequencies for the 6 months and each future month, KAM 140 may use only the most recent 6 months. In this way KAM 140 calculates a running average of the frequency using only the most recent data.

At step 330, in some embodiments KAM 140 determines an expected frequency of the first keyword in a set of records associated with a first dimension. KAM 140 determines the expected frequency of a keyword for set of records 125 within dimension 127. In some embodiments, the expected frequency is generally limited to a particular keyword and a particular set of records 125. For example, KAM 140 may determine the expected frequency of the keyword "global" in set of records 125c, which may correspond to the Asian Pacific region of the word. KAM 140 may repeat multiple steps in the method in order to determine the expected frequencies for "global" in a different set of records 125 (e.g., 125a and 125b which each correspond to different data sets in the enterprise) and/or to determine the expected frequencies for other keywords. Once KAM 140 determines the expected frequency using the average method at step 330, the method continues to step 344, as described below.

If, at step 324, KAM 140 determines to not use the average method to determine the expected frequency, the method continues to step 332. At step 332, in some embodiments, KAM determines whether to use the correlation method to determine the expected frequency of a first keyword. KAM 140 may receive the preferred method in a request from administrator 151 to determine whether a word is overrepresented or underrepresented. KAM 140 may also analyze the information it has available to determine whether to use the correlation method. For example, the correlation method requires information on the frequency of at least two keyword for at least a certain period of time (e.g., last 12 months) in the same set of records 125. If KAM 140 determines it does not have the necessary information, it may determine not to use the correlation method. If KAM 140 determines not to use the correlation method at step 332, the method ends. If KAM 140 determines to use the correlation method at step 332, the method continues to step 334.

At step 334, in some embodiments KAM 140 determines the frequency of the first keywords in the first set of records 125 for a first time. The first time may be a plurality of time periods, for example, KAM 140 may determine the frequency for the past 12 months determining the frequency at various time intervals such as weekly, daily, bi-monthly or monthly. At step 336, KAM 140, in some embodiments, determines the frequency of the second keyword in the first set of records 125 for the first time period. Determining these frequencies in steps 334 and 336 can be performed using one or more of the techniques discussed above with respect to steps 310 and 312. At step 338, in some embodiments, KAM 140 determines the correlation between the frequency of the first keyword and the frequency of the second keyword. In some embodiments, KAM 140 may determine a line equation and R-squared value to show the determined correlation, as discussed above with respect to FIG. 2.

At step 340, in some embodiments, KAM 140 determines the frequency of the second keyword in set of records 125 for a second time period. Determining the frequency can be performed using one or more of the techniques discussed above with respect to steps 310, 312, 334, and 336. For example, KAM 140 may determine the frequencies of each keyword in step 334 and 336 for every month of the past year. In step 340, KAM 140 may determine the frequency of the second keyword, such as "fraud" in the first set of records (e.g., 125d) for a second time period, such as the current month.

KAM 140, in some embodiments, determines the expected frequency for the first keyword, in the first set of records for the second time period at step 342. KAM 140 may rely on the correlation determined in step 338 and the frequency of the second keyword determined in step 340. As one example, KAM 140 may determine the correlation between the first keyword and the second keyword in step 338 as a 2 to 1 ratio; in other words, the first keyword shows up twice as often as the second keyword in a particular set of records, such as 125c. Continuing the example, in step 340, KAM 140 may determine the frequency of the second keyword (e.g., fraud) for the current month, such as December 2014 is 12, thus, in step 342 KAM 140 would determine the expected frequency for the first keyword (e.g., global) in set of record 125c may be 24.

At step 344, in some embodiments, KAM 140 may compare the frequency of the first keyword and the expected frequency. KAM 140 may compare the two to determine which is larger. For example, if the actual frequency is 15 and the expected frequency is 17, KAM 140 may determine that the actual frequency is less than the expected frequency. KAM 140 may also compare the two to determine whether there is at least a threshold difference between the two frequencies. For example, the threshold may be 15, and if KAM 140 compares the actual frequency of 10 to the expected frequency of 30, KAM 140 may determine the actual frequency is at least a threshold difference below the expected frequency. KAM 140 may also use various statistical methods, such as a Chi-Squared test and a Cochran-Mantel-Haenszel Test, to determine that the difference between the actual frequency and the expected frequency is statistically significant.

At step 336, in some embodiments, KAM 140 may determine whether the first keyword is overrepresented or underrepresented in the first set of records. KAM 140 may use the comparison determined in step 334 to determine overrepresentation or underrepresentation. In some embodiments, KAM 140 may only determine that the actual frequency is less than the expected frequency to determine that the first keyword is underrepresented. For example, in step 310 KAM 140 may determine the actual frequency of the first keyword for December 2014 in set of records 125b is 30, while the expected frequency, as determined in step 322, 330, or 342 is 5. In this example, KAM 140 may determine the keyword is underrepresented for December 2014 in set of records 125b. In certain embodiments, KAM 140 may require that the difference between the actual frequency and the expected frequency is above a certain threshold or a statistically significant difference in order to determine that the first keyword is underrepresented. For example, if the expected frequency in set of records 125f is 50 and the actual frequency is 51 KAM 140 may not determine if the first keyword is overrepresented because it is only 1 instance higher than the expected frequency. As another example, KAM 140 may determine that the actual frequency of the first keyword "global" is 100 while the expected frequency is 150. Continuing the example, because the difference between the two is 50 instances, KAM 140 may determine that the first keyword is underrepresented. KAM 140 may use any threshold when comparing the actual frequency of the first keyword and expected frequency of step 344 for determining overrepresentation or underrepresentation at step 346. If KAM 140 determines at step 346 that the first keyword is neither overrepresented nor underrepresented, the method ends. If KAM 140 determines at step 346 that the first keyword is either overrepresented or underrepresented, the method continues to step 348.

At step 348, in some embodiments, KAM 140 determines a degree of overrepresentation or underrepresentation of the first keyword. KAM 140 may use a threshold to determine this degree or a plurality of thresholds. For example, if the expected frequency is 100, KAM 140 may have three thresholds of 20, 30 and 50 to determine the degree of overrepresentation or underrepresentation. For example, if the keyword "global" appears 120 times, KAM 140 may determine "global" only has a small degree of overrepresentation. If the actual frequency is 130, "global" may have a medium degree of overrepresentation. If "global" has an actual frequency of 160, which is more than 50 instances above the expected frequency, it may have a highest degree of overrepresentation. KAM 140 may use any number of thresholds spaced any number of instances apart to determine the degree of overrepresentation or underrepresentation.

KAM 140, in some embodiments, may translate the frequency of the first keyword, the frequency of the second keyword, the expected frequency of the first keyword, and the comparison between the actual frequency of the first keyword and the expected frequency of the first keyword into a keyword report at step 350. The keyword report may take on any form that may facilitate understanding by administrator 151. For example, the keyword report may comprise an alert describing that the first keyword is underrepresented or overrepresented in a particular set of records 125. As another example, the keyword report may be in the form of an email that includes various numbers of instances of a plurality of keywords in a plurality of sets of data 125 and dimensions 127. The keyword report may provide an alert that a specific keyword is underrepresented in a particular dimension and give a report of how this keyword appears in different dimensions or different sets of records 125 within dimension 127. At step 352, KAM 140 may communicate the keyword report for display at administrator work station 150. By providing information regarding overrepresentation or underrepresentation of keywords, administrator 151 may further investigate to determine why the keyword is missing or appears frequently. For example, administrator 151 may want to determine why certain keywords were not included in records 124 when they should have been, or determine whether the absence of the keyword is indicative of a problem, such as future operational losses. By notifying administrator 151 of either an overrepresentation or an underrepresentation, KAM 140 allows administrator 151 to further determine why this is occurring and if it is indicative of any issues or potential problems within the enterprise.

At step 354, in some embodiments, KAM 140 may generate a visualization based on the first frequency of the first keyword and a degree of overrepresentation or underrepresentation of the first keyword. Examples of visualizations may be a tree map, an example of which is shown in FIG. 4, a word cloud as described below, or any type of visualization of data that would facilitate administrator 151 to understand the overrepresentation or underrepresentation of certain keywords in certain sets of record 125. It may be beneficial to provide this information to administrator 151 to facilitate identifying the most overrepresented or most underrepresented keywords. The visualization may allow administrator 151 to focus on the keywords that are indicative of potential problems within the enterprise. At step 356, KAM 140 communicates the visualization generated at step 354 for display at work station 150. After the visualization is communicated, the method ends.

Modifications, additions, or omissions may be made to the methods described herein without departing from the scope of the invention. For example, the steps may be combined, modified, or deleted where appropriate, and additional steps may be added. For example, steps 310-320 may be omitted and rather than using an expected proportion to determine an expected frequency, KAM 140 may use the correlation between two keywords determined in step 338 to determine the expected frequency. Additionally, the steps may be performed in any suitable order without departing from the scope of the present disclosure. While discussed as KAM 140 performing the steps, any suitable component of system 100, may perform one or more steps of the method.

FIG. 4 illustrates an example tree map showing the frequency and degree of overrepresentation or underrepresentation of a plurality of keywords. FIG. 4 may be generated using one or more of the techniques discussed above with respect to step 354 of FIG. 3C. The tree map in FIG. 4 illustrates the words: global, terrible, system, card, legal, bank, counsel, enterprise, gap, data, audit, sale, help, and desk. The size of each rectangle in the tree map represents the frequency that the word appears in a plurality of records 124 across multiple sets of records 125. For example, the keyword "global" is in the largest box, which means that it shows up in records 124 most frequently compared to the other words displayed in the tree map. The shading of the rectangles represents the degree of overrepresentation or underrepresentation of the keyword, such that the darker rectangles have a higher degree of overrepresentation (e.g., an actual frequency larger than the expected frequency) and the lighter rectangles have a higher degree of underrepresentation (e.g., an actual frequency smaller than the expected frequency) as determined by KAM 140. The darkest level of shading includes "terrible" and "audit," which shows that these two words have the highest degree of overrepresentation significance. The keyword "terrible" has a larger rectangle size because it appears more frequently in records 124 than "audit" does. The remaining levels of shading in order of decreasing significance includes: (1) "global" and "legal," (2) "enterprise" and "help," and (3) the rest of the rectangles are all white, or have the least amount of shading, which means that they have the highest degrees of underrepresentation as determined by KAM 140.

In some embodiments, administrator 151 may select a subset of the rectangles to generate an additional tree map containing just the subset of rectangles. This allows for a more in depth view of these keywords in comparison to each other. In certain embodiments, administrator 151 may select a single keyword to show additional information about the keyword, such as the records 124 that the keyword appears in, or any other detail regarding the keyword. It is beneficial for administrator 151 to view a tree map, such as the one shown in FIG. 4, to be able to rapidly determine the keywords with the highest degree of either overrepresentation or underrepresentation and the largest frequency, which are the words that may predict issues with the enterprise.

In some embodiments, KAM 140 may use the information regarding the frequency of a keyword and the degree of either overrepresentation or underrepresentation to create a word cloud. In the word cloud, the size of the word represents the frequency of the keyword, the larger the text of the word the higher the frequency of the keyword. The degree of shading of the font of the word itself represents the degree of overrepresentation or underrepresentation with the darker shading representing overrepresentation and the lighter shading representing underrepresentation.

Modifications, additions, or omissions may be made to the information for display described herein without departing from the scope of the invention. For example, system 100 may use any number of keywords in a particular tree map, rather than the specific amount depicted here. As another example, FIG. 4 may provide a "zoom in" and "zoom out" feature so administrator 151 can review a large graphic of the keywords across various dimensions 127 and then zoom in to focus on specific dimensions 127 or sets of records 125.

Certain embodiments of the present disclosure may provide one or more technical advantages. In certain embodiments, keyword frequency analysis system 100 generates reports or other information for display regarding the overrepresentation or underrepresentation of one or more keywords. This allows administrator 151 to readily identify the keywords that are overrepresented or underrepresented in certain sets of records 125, which indicates a potential issue, such as a future operational loss, for the enterprise. System 100 conserves computational resources when comparing the actual and expected frequencies of the keywords and allows administrator 151 to more readily identify the most significant risk to the enterprise.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A keyword frequency analysis system, comprising:
a memory operable to store a plurality of sets of records, wherein each set of records is associated with a dimension and comprises a first keyword and a second keyword;
an interface operable to:
receive the plurality of sets of records;
receive a request to determine whether the first keyword is a selected one of overrepresented or underrepresented in a first set of records, the request comprising a selection of a method to calculate an expected frequency of the first keyword;
one or more hardware processors communicatively coupled to the interface and the memory and operable to:
determine a frequency of the first keyword in each set of records;
determine a frequency of the second keyword in each set of records;
determine the method to calculate the expected frequency of the first keyword based on the selection of the method in the request to determine whether the first keyword is a selected one of overrepresented or underrepresented in the first set of records;
calculate the expected frequency of the first keyword in the first set of records associated with a first dimension using the method, the expected frequency of the first keyword being a number of times the first keyword should appear in the first set of records, the expected frequency of the first keyword based on the frequency of the first keyword and the frequency of the second keyword;
determine a difference between the frequency of the first keyword and the expected frequency;
compare the difference to a threshold, the threshold indicating whether the difference is large enough to determine one of a selected group of overrepresentation or underrepresentation;
in response to determining that the difference is not greater than the first threshold, communicate a message indicating that the first keyword is not overrepresented and not underrepresented;
in response to determining that the difference is greater than the first threshold:
determine whether the frequency of the first keyword is less than the expected frequency;
in response to determining that the frequency of the first keyword is less than the expected frequency:
determine that the first keyword is underrepresented in the first set of records;
determine a degree of underrepresentation by comparing the threshold and the difference between the frequency of the first keyword and the expected frequency;
translate the frequency of the first keyword, the frequency of the second keyword, the degree of underrepresentation, and the expected frequency into the keyword report, the keyword report comprising the expected frequency, the degree of underrepresentation, and the determination that the first keyword is underrepresented in the first set of records; and
communicate the keyword report for display.

2. The system of claim 1, wherein determining the expected frequency of the first keyword in the first set of records comprises:
determining a total first keyword frequency by summing the frequency of the first keyword in each set of records;
determining a first set of records keyword frequency by summing the frequency of the first keyword in the first set of records associated with the first dimension and the frequency of the second keyword in the first set of records associated with the first dimension;
determining a total dimension keyword frequency based on the total first keyword frequency and the first set of records keyword frequency;
based on the total first keyword frequency, first set of records keyword frequency, and the total dimension keyword frequency, determining an expected proportion;
based on the expected proportion, determining the expected frequency of the first keyword in the first set of records associated with the first dimension.

3. The system of claim 1, wherein determining the expected frequency of the first keyword in the first set of records comprises:
determining the frequency of the first keyword in each set of records for a plurality of past time periods;
calculating an average of the frequency of the first keyword for the plurality of past time periods; and
determining the expected frequency of the first keyword in the first set of records based on the average.

4. The system of claim 1, wherein the expected frequency of the first keyword in the first set of records is a range of numbers, the range of numbers corresponding to a confidence interval.

5. The system of claim 1, wherein the hardware processor is further operable to:
determine the frequency of the first keyword in the first set of records for a first time period;
determine the frequency of the second keyword in the first set of records for the first time period;

determine a correlation between the frequency of the first keyword and the frequency of the second keyword;

determine the frequency of the second keyword in the first set of records for a second time period; and based on the correlation and on the frequency of the second keyword in the first set of records for the second time period, determine the expected frequency for the first keyword in the first set of records for the second time period.

6. The system of claim 1, wherein the hardware processor is further operable to:

generate a visualization based on the first frequency of the first keyword and the degree of underrepresentation of the first keyword; and communicate the visualization for display.

7. A non-transitory computer-readable medium encoded with logic, the logic operable when executed to:

store a plurality of sets of records, wherein each set of records is associated with a dimension and comprises a first keyword and a second keyword;

receive the plurality of sets of records;

receive a request to determine whether the first keyword is a selected one of overrepresented or underrepresented in a first set of records, the request comprising a selection of a method to calculate an expected frequency of the first keyword;

determine a frequency of the first keyword in each set of records;

determine a frequency of the second keyword in each set of records;

determine the method to calculate the expected frequency of the first keyword based on the selection of the method in the request to determine whether the first keyword is a selected one of overrepresented or underrepresented in the first set of records;

determine the expected frequency of the first keyword in the first set of records associated with a first dimension using the method, the expected frequency of the first keyword being a number of times the first keyword should appear in the first set of records, the expected frequency of the first keyword based on the frequency of the first keyword and the frequency of the second keyword;

determine a difference between the frequency of the first keyword and the expected frequency;

compare the difference to a threshold, the threshold indicating whether the difference is large enough to determine one of a selected group of overrepresentation or underrepresentation;

in response to determining that the difference is not greater than the first threshold, communicate a message indicating that the first keyword is not overrepresented and not underrepresented;

in response to determining that the difference is greater than the first threshold:

determine whether the frequency of the first keyword is less than the expected frequency;

in response to determining that the frequency of the first keyword is less than the expected frequency:

determine that the first keyword is underrepresented in the first set of records;

determine a degree of underrepresentation by comparing the threshold and the difference between the frequency of the first keyword and the expected frequency;

translate the frequency of the first keyword, the frequency of the second keyword, the degree of underrepresentation, and the expected frequency into the keyword report, the keyword report comprising the expected frequency, the degree of underrepresentation, and the determination that the first keyword is underrepresented in the first set of records; and communicate the keyword report for display.

8. The computer-readable medium of claim 7, wherein the logic is further operable to:

determine a total first keyword frequency by summing the frequency of the first keyword in each set of records;

determine a first set of records keyword frequency by summing the frequency of the first keyword in the first set of records associated with the first dimension and the frequency of the second keyword in the first set of records associated with the first dimension;

determine a total dimension keyword frequency based on the total first keyword frequency and the first set of records keyword frequency;

based on the total first keyword frequency, first set of records keyword frequency, and the total dimension keyword frequency, determine an expected proportion;

based on the expected proportion, determine the expected frequency of the first keyword in the first set of records associated with the first dimension.

9. The computer-readable medium of claim 7, wherein the logic is further operable to:

determine the frequency of the first keyword in each set of records for a plurality of past time periods;

calculate an average of the frequency of the first keyword for the plurality of past time periods; and determine the expected frequency of the first keyword in the first set of records based on the average.

10. The computer-readable medium of claim 7, wherein the expected frequency of the first keyword in the first set of records is a range of numbers, the range of numbers corresponding to a confidence interval.

11. The computer-readable medium of claim 7, wherein the logic is further operable to:

determine the frequency of the first keyword in the first set of records for a first time period;

determine the frequency of the second keyword in the first set of records for the first time period;

determine a correlation between the frequency of the first keyword and the frequency of the second keyword;

determine the frequency of the second keyword in the first set of records for a second time period; and based on the correlation and on the frequency of the second keyword in the first set of records for the second time period, determine the expected frequency for the first keyword in the first set of records for the second time period.

12. The computer-readable medium of claim 7, wherein the logic is further operable to:

generate a visualization based on the first frequency of the first keyword and the degree of underrepresentation of the first keyword; and communicate the visualization for display.

13. A keyword frequency analysis method, comprising:

storing a plurality of sets of records in a memory, wherein each set of records is associated with a dimension and comprises a first keyword and a second keyword;

receiving, at an interface, the plurality of sets of records;

receiving, at the interface, a request to determine whether the first keyword is a selected one of overrepresented or underrepresented in a first set of records, the request comprising a selection of a method to calculate an expected frequency of the first keyword;

determining, by a processor, a frequency of the first keyword in each set of records;

determining, by the processor, a frequency of the second keyword in each set of records;

determining, by the processor, the method to calculate the expected frequency of the first keyword based on the selection of the method in the request to determine whether the first keyword is a selected one of overrepresented or underrepresented in the first set of records;

calculating, by the processor, the expected frequency of the first keyword in the first set of records associated with a first dimension using the method, the expected frequency of the first keyword being a number of times the first keyword should appear in the first set of records, the expected frequency of the first keyword based on the frequency of the first keyword and the frequency of the second keyword;

determining a difference between, by the processor, the frequency of the first keyword and the expected frequency;

comparing the difference to a threshold, the threshold indicating whether the difference is large enough to determine one of a selected group of overrepresentation or underrepresentation;

in response to determining that the difference is not greater than the first threshold, communicating a message indicating that the first keyword is not overrepresented and not underrepresented;

in response to determining that the difference is greater than the first threshold:
  determining whether the frequency of the first keyword is less than the expected frequency;
    in response to determining that the frequency of the first keyword is less than the expected frequency:
      determining that the first keyword is underrepresented in the first set of records;
      determining a degree of underrepresentation by comparing the threshold and the difference between the frequency of the first keyword and the expected frequency;
      translating the frequency of the first keyword, the frequency of the second keyword, the degree of underrepresentation, and the expected frequency into the keyword report, the keyword report comprising the expected frequency, the degree of underrepresentation, and the determination that the first keyword is underrepresented in the first set of records; and
    communicating the keyword report for display by the interface.

14. The method of claim 13, wherein determining the expected frequency of the first keyword in the first set of records comprises:
  determining, by the processor, a total first keyword frequency by summing the frequency of the first keyword in each set of records;
  determining, by the processor, a first set of records keyword frequency by summing the frequency of the first keyword in the first set of records associated with the first dimension and the frequency of the second keyword in the first set of records associated with the first dimension;
  determining, by the processor, a total dimension keyword frequency based on the total first keyword frequency and the first set of records keyword frequency;
  based on the total first keyword frequency, first set of records keyword frequency, and the total dimension keyword frequency, determining, by the processor, an expected proportion;
  based on the expected proportion, determining, by the processor, the expected frequency of the first keyword in the first set of records associated with the first dimension.

15. The method of claim 13, wherein determining the expected frequency of the first keyword in the first set of records comprises:
  determining, by the processor, the frequency of the first keyword in each set of records for a plurality of past time periods;
  calculating an average of the frequency of the first keyword for the plurality of past time periods; and
  determining, by the processor, the expected frequency of the first keyword in the first set of records based on the average.

16. The method of claim 13, wherein the expected frequency of the first keyword in the first set of records is a range of numbers, the range of numbers corresponding to a confidence interval.

17. The method of claim 13, further comprising:
  determining, by the processor, the frequency of the first keyword in the first set of records for a first time period;
  determining, by the processor, the frequency of the second keyword in the first set of records for the first time period;
  determining, by the processor, a correlation between the frequency of the first keyword and the frequency of the second keyword;
  determining, by the processor, the frequency of the second keyword in the first set of records for a second time period; and
  based on the correlation and on the frequency of the second keyword in the first set of records for the second time period, determining, by the processor, the expected frequency for the first keyword in the first set of records for the second time period.

18. The method of claim 13, further comprising:
  generating a visualization based on the first frequency of the first keyword and the degree of underrepresentation of the first keyword; and
  communicating the visualization for display by the interface.

* * * * *